Sept. 5, 1967      K. Q. KESSLER      3,339,354
STALK HARVESTING APPARATUS AND THE LIKE
Filed Jan. 28, 1965      4 Sheets-Sheet 1
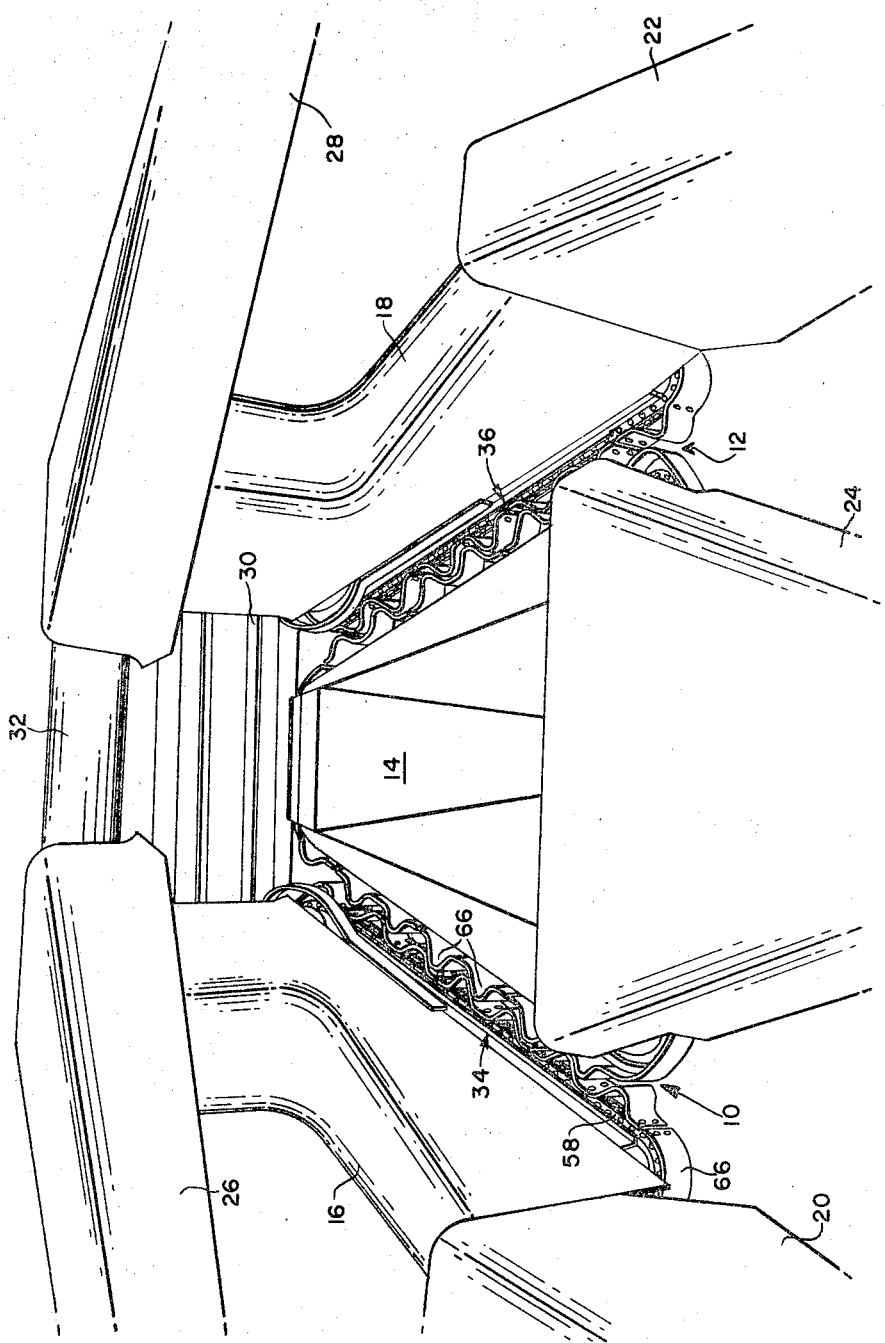
INVENTOR.
K. Q. KESSLER

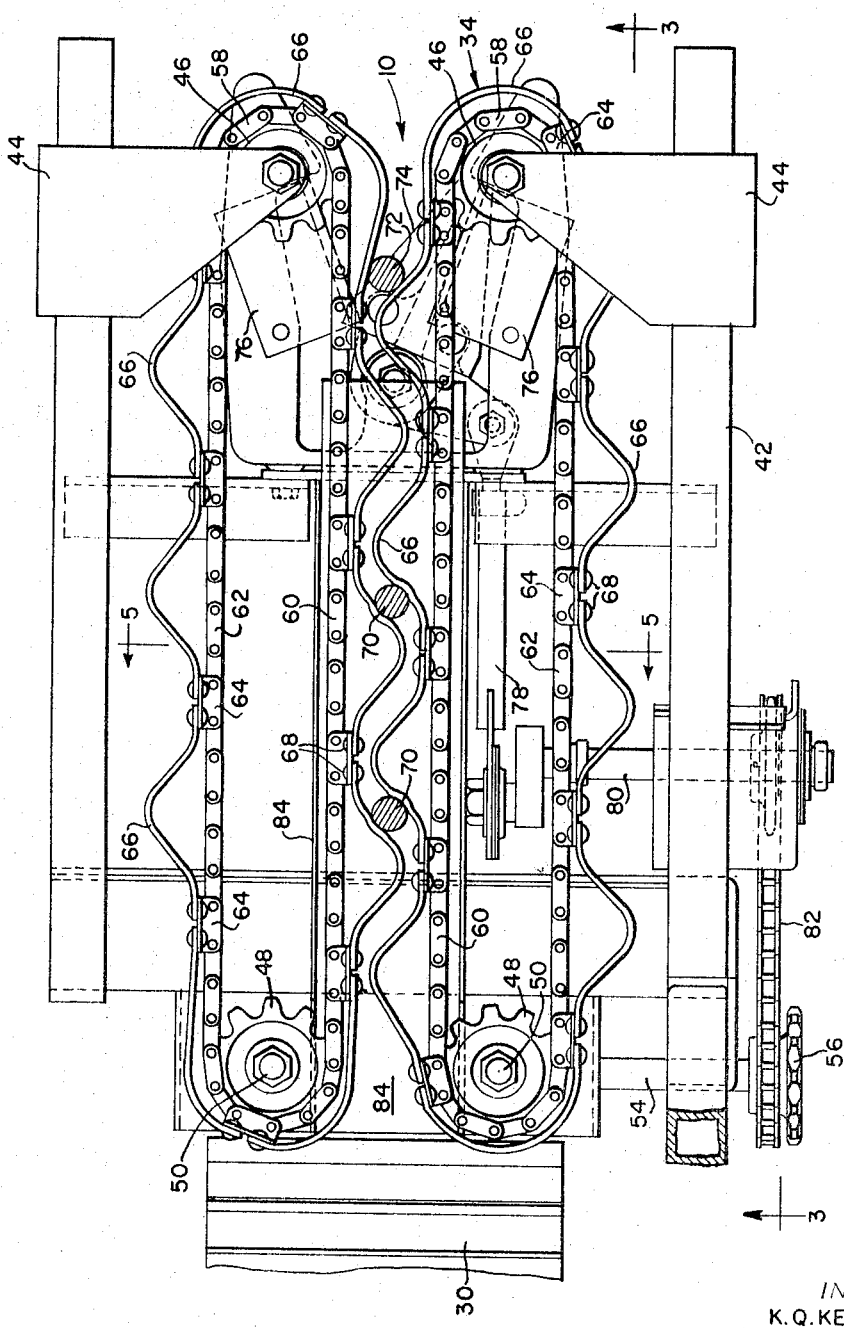

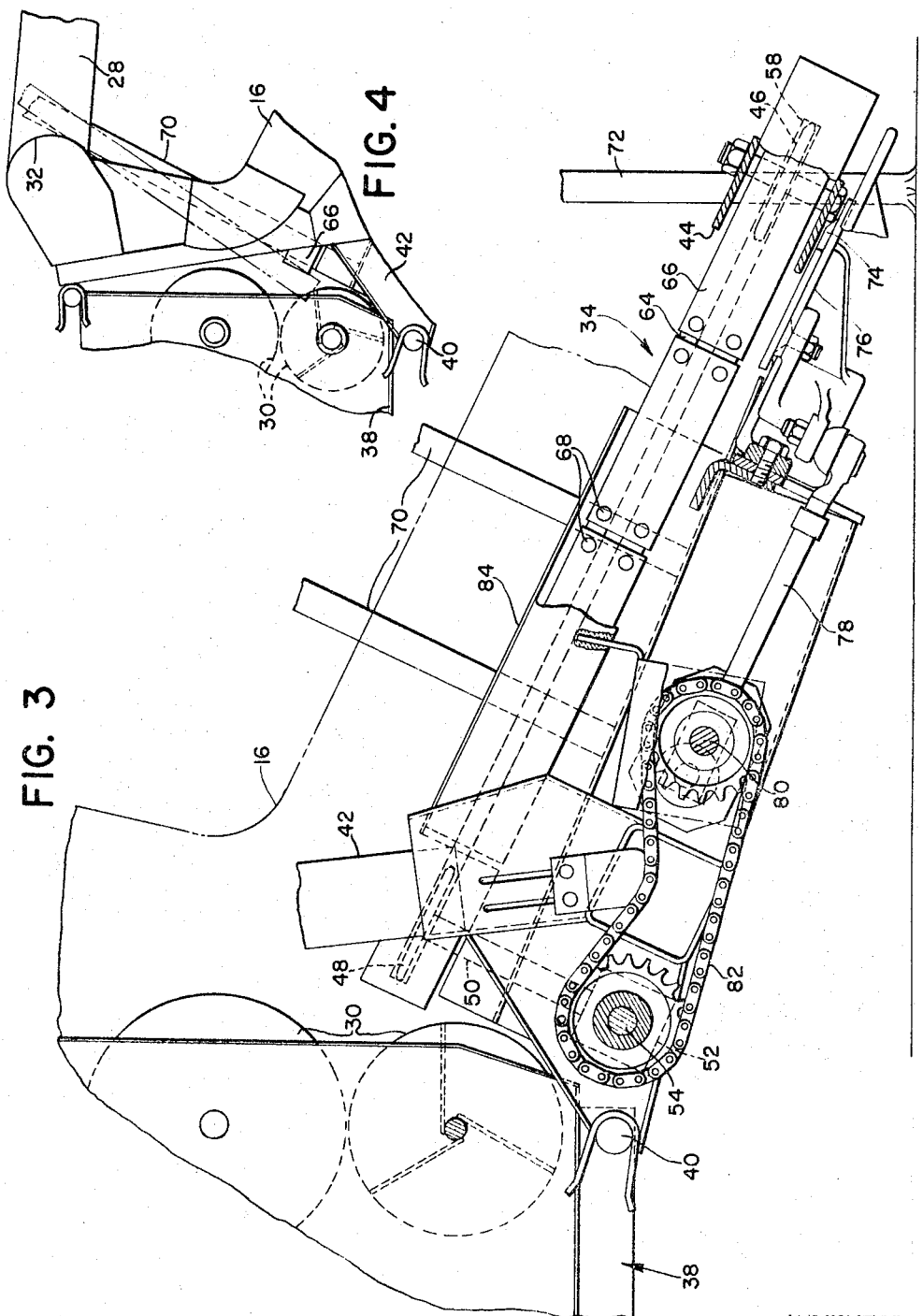

Sept. 5, 1967  K. Q. KESSLER  3,339,354
STALK HARVESTING APPARATUS AND THE LIKE
Filed Jan. 28, 1965  4 Sheets-Sheet 4

*INVENTOR.*
K. Q. KESSLER

United States Patent Office 3,339,354
Patented Sept. 5, 1967

3,339,354
STALK HARVESTING APPARATUS
AND THE LIKE
Kenneth Q. Kessler, Ottumwa, Iowa, assignor to Deere &
Company, Moline, Ill., a corporation of Delaware
Filed Jan. 28, 1965, Ser. No. 428,652
4 Claims. (Cl. 56—98)

ABSTRACT OF THE DISCLOSURE

Stalk conveying means comprising a pair of endless belt-like conveyors disposed respectively alongside the fore-and-aft stalk passageway of a harvester and having cooperative loop-like flexible portions meshing with each other to grip and convey the stalks rearwardly along the passageway after the stalks have been severed from the ground.

---

A typical machine of the character referred to will involve a gathering unit including a pair of laterally spaced apart fore-and-aft extending members forming a passageway for receiving field-borne stalks and like crops as the machine advances over the field. Conventionally, the stalks will be severed from the ground at points thereon slightly above the ground and these stalks will be conveyed rearwardly into the machine which may be equipped with other mechanism for further treating the stalks. In the conventional gathering mechanism, it has heretofore been known to employ steel link chains operating in pairs, the proximate runs of the chains functioning to carry the stalk rearwardly while its lower end rested in a trough or butt pan somewhat coextensive with the stalk-receiving passageway. Such metallic chains, normally equipped with stalk-engaging lugs, create many problems, among which are inefficient feedings, wrapping of the stalks particularly at the discharge zone where the stalks are fed into feed rolls or the like, short life and noisy operation.

According to the present invention, these disadvantages are eliminated and an improved gathering mechanism is provided, featuring low cost, long life and efficiency in operation. More specifically, it is an object to utilize gathering means in the form of one or more cooperating conveyors, equipped with stalk- or crop-engaging elements in the form of looped-out flexible members preferably formed of what is known in the industry as tire carcass material, a relatively tough rubber fabric composition derived from used vehicle tires; although, equivalent flexible means may be employed. Still another object is to utilize conveyors of this type in pairs with the looped-out elements "meshing" so as to form crop-gripping means. It is a feature of the invention that the looped-out elements, as they "turn the corners" about their respective guides, sprockets, sheaves etc., flatten out or lose their projecting characteristic and thereby freely release the stalks to the feed rolls or other mechanism without involving wrapping. It is a still further object to provide a mechanism of the character described which may be readily adapted to machines already in the field as well as being provided as part of the gathering mechanism of machines undergoing assembly.

The foregoing and other important objects and desirable features inherent in and encompassed by the invention will become apparent as preferred embodiments thereof are disclosed in detail in the ensuing description and accompanying sheets of drawings, the figures of which are described below.

FIG. 1 is a perspective front view of a portion of a gathering mechanism of the two-row type equipped with the novel handling mechanism.

FIG. 2 is a plan view of one of the row units with the sheet metal or superstructure removed so as to expose the conveyor mechanism.

FIG. 3 is a longitudinal section generally along the line 3—3 of FIG. 2 with intermediate portions broken away to expose background structure.

FIG. 4 is a fragmentary view, on a reduced scale, showing the manner in which the stalks are delivered to the feed rolls.

Figure 6:
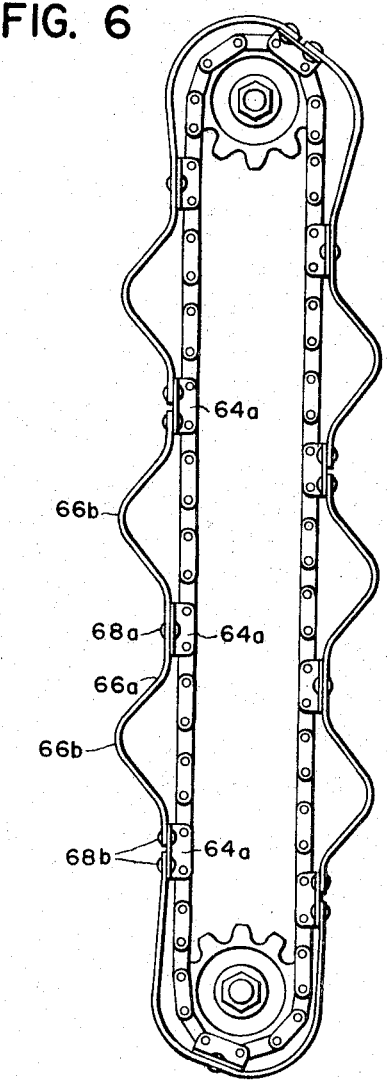
FIG. 6 is a plan of a modified conveyor unit.

Those familiar with forage and ensilage harvesters will recognize in FIG. 1 a gathering mechanism of the two-row type, stalk-receiving passageways occurring at 10 and 12, each adapted to receive field-borne stalks as the machine advances. The direction of advance is toward the reader. The gathering mechanism is made up of typically related sheet metal components establishing a central section 14 and right- and left-hand fore-and-aft outer sections 16 and 18. The section 16 terminates in a right-hand outer divider 20, and a similar outer divider 22 is provided for the section 18. A central divider 24 projects forwardly from and completes the center section 14. The dividers respectively converge forwardly so as to afford relatively wide mouths for the passages 10 and 12, it being understood that the dividers guide the stalks from the respective rows into the respective passageways, being assisted further by right- and left-hand upper guide portions 26 and 28. In the background of FIG. 1 will be seen one of a pair of cooperating transverse feed rolls 30 which provide stalk-receiving means into which the stalks are ultimately fed to be further handled by mechanism not material here. Above and forwardly of the feed roll is a cross member 32 which aids in tilting the stalks so as to improve their entry to the feed rolls. The frame that carries the components just described further carries conveyor means in each of the passageways 10 and 12. That for the passageway 10 is designated generally by the numeral 34 and that for the passageway 12 at 36. Since these are identical, or at least symmetrical, only the unit 34 will be described, having particular reference to FIGS. 2 and 3.

As seen in FIG. 3, the basic frame of the mobile machine is designated at 38 as carrying the feed rolls 30 and further as being equipped with a front transverse mounting means 40 on which the gathering unit is mounted and from which the gathering unit projects forwardly. This unit itself is comprised of a frame 42, made up of several components rigidly joined together so as to afford the passageway 10 and so as to support the unit or conveyor 34.

Longitudinal portions of the frame 42 mount, by means of supports 44, a pair of front carriers 46, each of which is here shown as a sprocket. Appropriate supports at the rear of the frame 42 carry a pair of transversely spaced apart carriers or sprockets 48. Each of these is keyed to a generally upright shaft 50 which extends into a gear box 52 that contains appropriate gearing (not shown) driven by a cross shaft 54. An outer sprocket 56 (FIG. 2) may receive power from any suitable source on the basic machine 38 for driving the units 34. The shaft 54 may extend across to another gear box like the gear box 52 for driving the shaft 50 for the other rear sprocket 48. The sprockets 46 are journalled on their respective supports 44.

The front and rear carriers 46 and 48 for one of the units 34 are of course spaced lengthwise of and alongside the passageway 10, as are the carriers 46 and 48 for the other of the units 34. Each pair of carriers 46 and 48 has trained thereabout an endless flexible element, here in the form of a link chain 58 so that each chain has an inner run or longitudinal stretch thereof, as at 60, running along one side of the passageway 10, the inner runs or stretches being spaced apart as best shown in FIG. 2. Each chain of course has its outer stretch, as at 62, relatively remote from the passage as the chains return about their rear carriers toward their front carriers. The chains and sprockets are driven so that the inner runs 60 travel rearwardly.

Each chain carries thereon a plurality of attachment means 64. These are spaced apart uniformly about the chain. Mounted on each chain by means of the attachment means is a stalk-engaging means generally coextensive with the chain and including a plurality of flexible portions or elements 66, each in the form of a loop that occurs where it projects from a straight stretch of the chain, giving the stalk-engaging means a sinuous configuration along the straight stretch and including a series of alternate loops and valleys. Each loop "disappears" as it occupies a position about a carrier and negatives the sinuous configuration at these carriers, as will be brought out below.

In that form of the invention shown in FIGS. 1–5, each loop is an individual member of resilient flexible material such as that derived from tire carcass material. Considering its location relative to a straight portion of its chain, its effective length is greater than the distance between a pair of neighboring attachment means 64. Consequently, when opposite ends of a portion or element 66 is attached to neighboring attachment means, as by rivets 68, the central portions of the elements will be caused to bulge or loop out as already described. On the other hand, the length of each element or portion is such that when it is wrapped about that portion of the chain that is carried by a carrier 46, 48, it "flattens out" or relatively closely hugs its carrier, as best seen in the front and rear portions of FIG. 2. The distance between each attachment means 64 and its neighbor may be regarded as the "pitch" or spacing between the valleys that alternate with the loops 66, and the extent to which each loop projects from a straight run of the chain may be seen as its height. In order that the loops can be made to "disappear" about a carrier 46, 48, its height should be such, relative to the aforesaid pitch, that the length of the material between each neighboring pair of attachment means 64 is substantially used up around the arcuate part of the carrier or sprocket. In the embodiment shown, the height of a loop will be seen in FIG. 2 to be on the order of about one-third of the pitch. This proportion, on the basis of sprockets 46 and 48 of the diameter chosen in this design, produces the necessary "disappearing" or "sprocket-hugging" result. The relationship between the stalk-engaging means on the associated pair of conveyors is such that the loops of each conveyor "mesh" with the valleys between the loops of the other conveyor, and the chains are driven in timed relationship to maintain this condition. This is also best shown in FIG. 2, wherein it will readily appear that each looped-out portion 66 enters between the valley between a pair of looped-out portions 66 on the opposite chain. As the stalks are severed from the field, by means to be described below, they are seized by the meshing loops and carried along the passageway 10. A pair of stalks so carried are designated at 70. The numeral 72 designates a stalk being cut by an oscillating knife 74 associated with a pair of laterally spaced apart fixed cutters 76 and driven by a pitman 78 from a cross shaft 80 just ahead of the cross shaft 54. A chain and sprocket drive 82 between the shafts 54 and 80 may be taken as representative of any suitable drive means.

Figure 5:
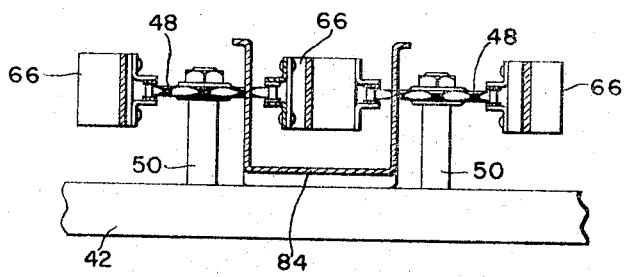
FIG. 5 is a transverse section on the line 5—5 of FIG. 2.

The frame carries, substantially coextensively with the passageway 10, a trough or butt pan 84, best seen in FIG. 5. As the stalks are cut by the sickle and seized by the cooperating portions 66, their bottoms ride along the bottom of the butt pan, and the gripped stalks are held substantially upright as they are conveyed rearwardly to the feed rolls 30. Since the elements 66 flatten out or disappear as they pass around the respective carriers 48 in opposite outward directions, they afford what may be regarded as a discharge or delivery zone 84 leading to the feed rolls 30. At this time, the upper portions of the stalks will strike the cross portion 32 of the superstructure (FIG. 4) so that these upper ends are retarded as the lower ends are accelerated into the feed rolls 30, entering the feed rolls horizontally to be handled by other mechanism on the machine (not shown). Since the portions 66 flatten out or disappear laterally outwardly of the discharge zone 84, they do not tend to carry the stalks around with them as is the case in conventional steel chains equipped with steel lugs. Moreover, the flattening out tendency occurs also at the inlet end of the passageway, thus affording easier entry of the stalks to the passageway. What is said for the row described applies of course to the opposite row having the passageway 12 and equipped with similar units.

In that form of the invention just described, the elements 66 are each of separate one-piece construction. However, this is not a limitation on the broad application of the invention. For example, each of the looped portions may be formed as part of an element twice as long as one that forms a single looped portion. In FIG. 6, such construction is shown, wherein a tire carcass element 66a contains two loops 66b, mounted on a plurality of attachment means 64a. Considering three of these attachment means, the central one has a single rivet 68a and those at each side of the central one have a pair of rivets 68b so as to connect the proximate ends of adjacent elements 66a.

Figure 7:
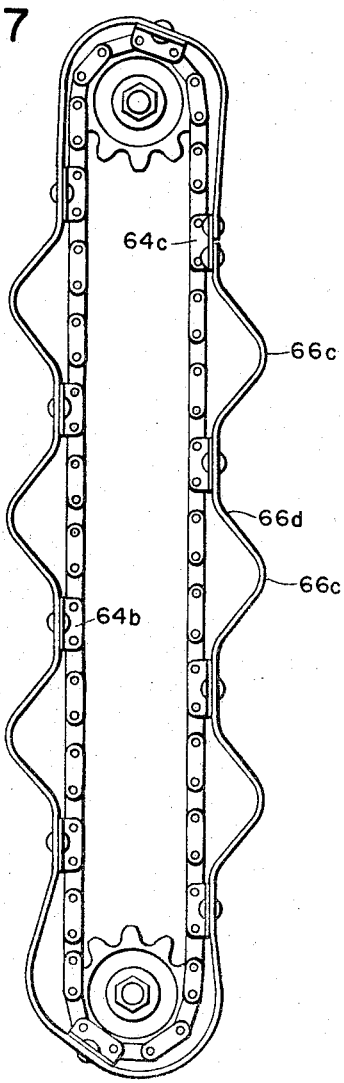
FIG. 7 is a plan of a still further modified form of unit.

In FIG. 7 is a construction in which the portions 66c are formed on an elongated one-piece tire carcass portion 66d, a plurality of attachment means 64b mounting intermediate portions of the element and a double attachment means 64c being used to connect the proximate ends of the element. The functional characteristics of all forms of the invention are of course the same.

It will be seen from the foregoing that a novel form of conveyor or handling means has been provided. In one aspect, these units are used in pairs so that the looped-out portions thereof "mesh" to handle the stalks or like articles. It is readily apparent that one of these units could be used in association with a longitudinal guide means so as to similarly convey stalks or like articles. Other modifications will readily occur to those versed in the art, as will features and advantages in addition to those enumerated, all without departure from the spirit and scope of the invention.

What is claimed is:

1. In stalk harvesting apparatus including frame means adapted to advance over a field of row-planted field-borne stalk crops and provided with a fore-and-aft elongated stalk-receiving passageway having front and rear ends and cutting means movable back and forth across and below the front end of the passageway for severing stalks from the field, the improvement residing in gathering mechanism for moving severed stalks in generally erect fashion rearwardly along the passageway, comprising a first set of front and rear carriers mounted respectively at said front and rear ends and spaced apart along one side of the passageway; a second set of front and rear carriers mounted respectively at said front and rear ends along the other side of the passageway respectively across from the first set of carriers; a first endless flexible belt-like means trained about the first set of carriers and a second endless flexible belt-like means trained about the second set of carriers, each means presenting an elongated inner straight stretch thereof closely along its side of the passageway with lengthwise spaced apart portions of each of said endless means curving respectively about its carriers and into its opposed outer stretch; stalk-engaging means generally coextensive with and carried by each endless means by a plurality of attachment means uniformly spaced apart along the endless means, each stalk-engaging means including a plurality of flexible portions, each portion extending between and attached to its endless means by a pair of neighboring attachment means and each portion having an effective length greater than the straight-line distance between a pair of neighboring attachment means to give its stalk-engaging means a sinuous configuration along its inner straight stretch and providing a series of alternate loops and valleys, said loops on each inner stretch projecting into the passageway and respectively into the valleys of the other inner stretch and intercooperative to engage stalks in the passageway; said front carriers being mounted in closely overlying relation to the cutting means and respectively having front curved portions about which the respective endless means are looped to provide a stalk inlet and the distance between each attachment means and its neighbor being so related to the extent to which each loop projects into the passage and to the curvature of its front carrier that as it passes about its said front carrier it relatively closely hugs its said front carrier and thereby negatives the aforesaid sinuous configuration in the area of said inlet while a stalk is being received; and means for moving the endless means to present a moving series of loops and valleys along the passageway.

2. The invention defined in claim 1, in which each portion is a portion of flexible material separate from each other portion and is attached by a pair of attachment means.

3. The invention defined in claim 2, in which each pair of neighboring portions is a portion of flexible material separate from each other pair of neighboring portions and each such pair is attached by three attachment means.

4. The invention defined in claim 1, including stalk-receiving means at the rear end of the passageway in proximity to the rear carriers, said rear carriers respectively having rear curved portions similar to the aforesaid front curved portions and about which the respective endless means are looped to provide a stalk delivery zone, and each flexible portion being thereby operative as above so that as it passes about its said rear carrier it relatively closely hugs its said rear carrier and thereby negatives the aforesaid sinuous configuration in the area of said exit area so as to release stalks at said delivery zone to the receiving means.

References Cited

UNITED STATES PATENTS

Re. 19,672    8/1935    Malcom et al. _____ 171—61 X
2,713,240    7/1955    West _____ 56—98

ABRAHAM G. STONE, *Primary Examiner.*

ANTONIO F. GUIDA, *Examiner.*